United States Patent [19]

Izuo et al.

[11] Patent Number: 5,049,253
[45] Date of Patent: Sep. 17, 1991

[54] ELECTRODE APPARATUS FOR DIALYSIS

[75] Inventors: Ryuji Izuo; Seiji Tachino; Masaaki Nakashima, all of Tokuyama, Japan

[73] Assignee: Tokuyama Soda Kabushiki Kaisha, Yamaguchi, Japan

[21] Appl. No.: 450,522

[22] Filed: Dec. 14, 1989

[30] Foreign Application Priority Data

Dec. 16, 1988 [JP] Japan .................................. 63-316189
Mar. 30, 1989 [JP] Japan .................................. 1-76841

[51] Int. Cl.⁵ .......................................... B01D 13/02
[52] U.S. Cl. .................................... 204/301; 204/296; 204/182.4; 204/DIG. 13
[58] Field of Search .................... 204/301, 182.4, 296, 204/DIG. 13

[56] References Cited

U.S. PATENT DOCUMENTS

| | | | |
|---|---|---|---|
| 2,816,862 | 12/1957 | Marchand | 204/301 |
| 2,878,178 | 3/1959 | Bier | 204/301 |
| 3,920,534 | 11/1975 | Jensen et al. | 204/301 |
| 4,105,534 | 8/1978 | Beatty, III | 204/301 |
| 4,647,380 | 3/1987 | Dasgupta | 210/638 |
| 4,654,137 | 3/1987 | Vaughan | 204/301 |
| 4,680,355 | 7/1987 | Nakahara et al. | 427/231 |
| 4,728,429 | 3/1988 | Cabasso et al. | 210/638 |
| 4,834,861 | 5/1989 | Inoue | 204/301 |

Primary Examiner—John F. Niebling
Assistant Examiner—Arun S. Phasge
Attorney, Agent, or Firm—Sherman and Shalloway

[57] ABSTRACT

An electrode is arranged in an integrally formed, seamless, self-supporting tubular ion exchanger, and a liquid supply and discharge mechanism for circulating an electrolyte is arranged in the tubular ion exchanger to construct an electrode apparatus for the dialysis. When this apparatus is used for the dialysis of an electrodeposition coating solution, leakage of the coating solution into the electrode portion and leakage of the electrolyte into a tank are prevented.

13 Claims, 7 Drawing Sheets

Fig. 4
Fig. 5
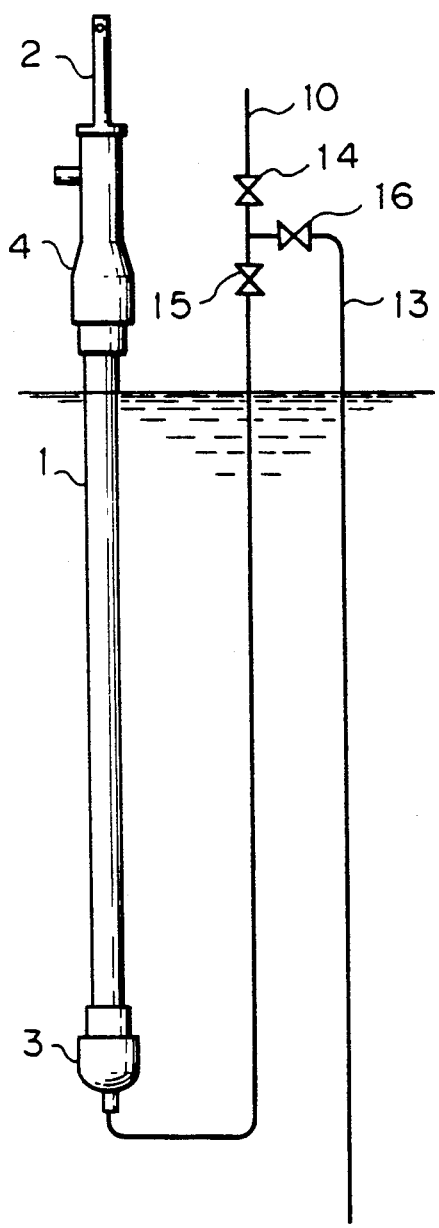
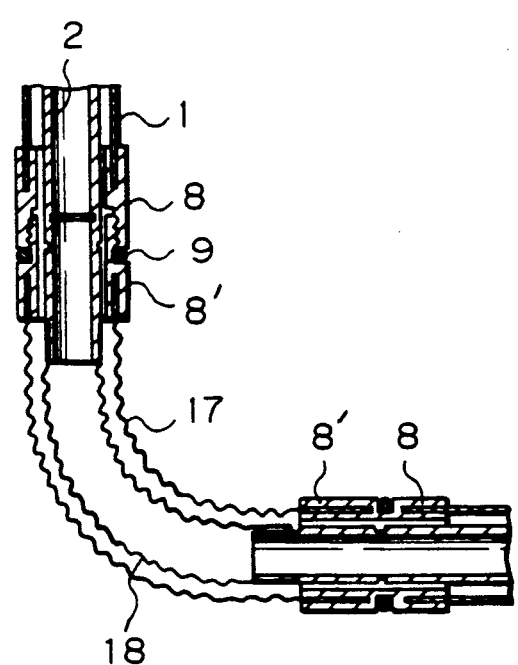

ELECTRODE APPARATUS FOR DIALYSIS

BACKGROUND OF THE INVENTION

(1) Field of the Invention

The present invention relates to an electrode apparatus for the dialysis, which can easily remove unnecessary ionic substances from a solution in electrodeposition coating, electroplating or the like. More particularly, the present invention relates to an electrode apparatus for the dialysis, valuably usable in electrodeposition coating, in which a counter electrode for the electrode of a material to be coated is separated from a solution through a tubular ion exchanger.

(2) Description of the Related Art

Electrodeposition coating is roughly divided into the anion type coating and cation type coating. An anionic paint or cationic paint composed mainly of a resin is used in the form of an aqueous solution, and an alkali or acid is added to the solution to adjust the electroconductivity of the solution. Accordingly, in carrying out electrodeposition coating, the paint solution is supplied with decrease of the paint component, and therefore, the alkali or acid in the solution is gradually accumulated to cause changes of the electroconductivity and other conditions, with the result that bad influences are imposed on smooth formation of a uniform coating. Accordingly, in order to eliminate this disadvantage, there is generally adopted a control method in which a counter electrode for the electrode of a material to be coated is separated from a solution through an ion exchange membrane and the alkali or acid is dialyzed and removed from the solution through the membrane.

In this electrodeposition coating, as the electrode separated by an ion-exchange membrane, there has been used an electrode unit apparatus dismountable from a solution, which comprises a box-type hollow vessel having an electrode disposed therein with an ion-exchange membrane as the barrier, as disclosed in Japanese Examined Patent Publication (Kokoku) No. 45-22231. In this membrane electrode apparatus of the box type comprising an ion-exchange membrane, however, even though the membrane is supported by a non-conductive net or porous structure, by the change of the hydraulic pressure of the solution caused by feeding and withdrawal of a material to be coated, the membrane is inevitably deformed and the membrane fails to maintain a good durability for a long time, and there is a risk of breaking of the membrane. Therefore, the membrane should be periodically exchanged with a fresh membrane, and because of weight of the apparatus, this exchange operation is not easy, with the result that the efficiency of the electrodeposition coating is reduced and the running cost increases.

As the means for overcoming this disadvantage, Japanese Examined Patent Publication (Kokoku) No. 57-27955 proposes a membrane electrode apparatus for the electrodeposition coating, in which it is intended to improve the durability of an ion-exchange membrane, increase the electrodeposition coating efficiency and reduce the size and weight of the apparatus. The diaphragm electrode apparatus for the electrodeposition coating, disclosed in Japanese Examined Patent Publication (Kokoku) No. 57-27955, is constructed so that an ion-exchange membrane is laminated on the surface of an electrode through a supporting member having a liquid-circulating mechanism to support the ion-exchange membrane with a good durability, and water is forcibly circulated from the outside through the supporting member to remove air bubbles adhering to the electrode and polarized molecules of impurities. More specifically, a cylindrical membrane electrode apparatus for the electrodeposition coating, which comprises an ion-exchange membrane wound and laminated on the periphery of a tubular electrode through a network spacer, is disclosed. In the barrier membrane electrode apparatus for the electrodeposition coating, proposed in Japanese Examined Patent Publication (Kokoku) No. 57-27955, since it is indispensable that the ion-exchange membrane should be laminated on the surface of the electrode through the supporting member, the troublesome operation of winding, laminating and bonding the ion-exchange membrane should be performed. Furthermore, in this ion-exchange membrane, a seam is inevitably formed on the side face, leaking of the electrodeposition coating liquid into the electrode compartment or leaking of the electrolyte into the tank of electrodeposition coating liquid is often caused.

In general, the ion-exchange membrane elongates in the electrodeposition coating liquid, and the ion-exchange membrane contracts when it is taken out from the electrodeposition coating liquid. In the above-mentioned barrier membrane electrode apparatus for the electrodeposition coating, since the ion-exchange membrane is fixed together with the membrane-supporting member to the electrode, the elongation and contraction of the ion-exchange membrane are not absorbed, and therefore, wrinkling is readily caused and there is a risk of breaking of the ion-exchange membrane.

SUMMARY OF THE INVENTION

Under this background, we made research with a view to developing a more effective membrane electrode apparatus for the electrodeposition coating. As the result, it was found that if an integrated, seamless tubular ion-exchange membrane having a desired strength, developed by us, is used as the barrier instead of the conventional ion-exchange membrane, an excellent membrane electrode apparatus can be constructed without using a supporting member or the like. We have now completed the present invention based on this finding.

It is therefore a primary object of the present invention to provide an electrode apparatus for the dialysis, comprising a self-supporting tubular ion exchanger formed integrally without any seam as the ion-exchange member, in which leaking of an electrodeposition coating liquid into the electrode portion and leaking of an electrolyte into a tank of electrodeposition coating liquid can be effectively prevented because wrinkling and breaking of the ion-exchange membrane by elongation and contraction thereof can be prevented.

More specifically, in accordance with one fundamental aspect of the present invention, there is provided an electrode apparatus for the dialysis, comprising an electrode and an ion-exchange membrane having a permselectivity to ions attracted in the electrode, wherein the electrode apparatus for the dialysis comprises a self-supportable tubular ion exchanger formed integrally with no seam, an electrode disposed within the ion tubular exchanger and arranged in the axial direction and a liquid supply and discharge mechanism for circulating an electrolyte from one end of the tubular ion exchanger to the other end thereof.

In accordance with another aspect of the present invention, there is provided an electrode apparatus for the dialysis as set forth above, wherein a lid is fitted on one end of the tubular ion exchanger, one end of the electrode is supported and secured to the lid, and the other end of the tubular ion exchanger is capable of moving in the axial direction according to the elongation and contraction of the tubular ion exchanger.

BRIEF DESCRIPTION OF THE DRAWINGS

FIG. 4 is a schematic arrangement diagram illustrating an example of the connection of a liquid supply and discharge tube to the electrode apparatus.

FIG. 5 is a sectional diagram illustrating an example of the connection of a plurality of electrode apparatuses.

DETAILED DESCRIPTION OF THE PRESENT INVENTION

Figure 1:
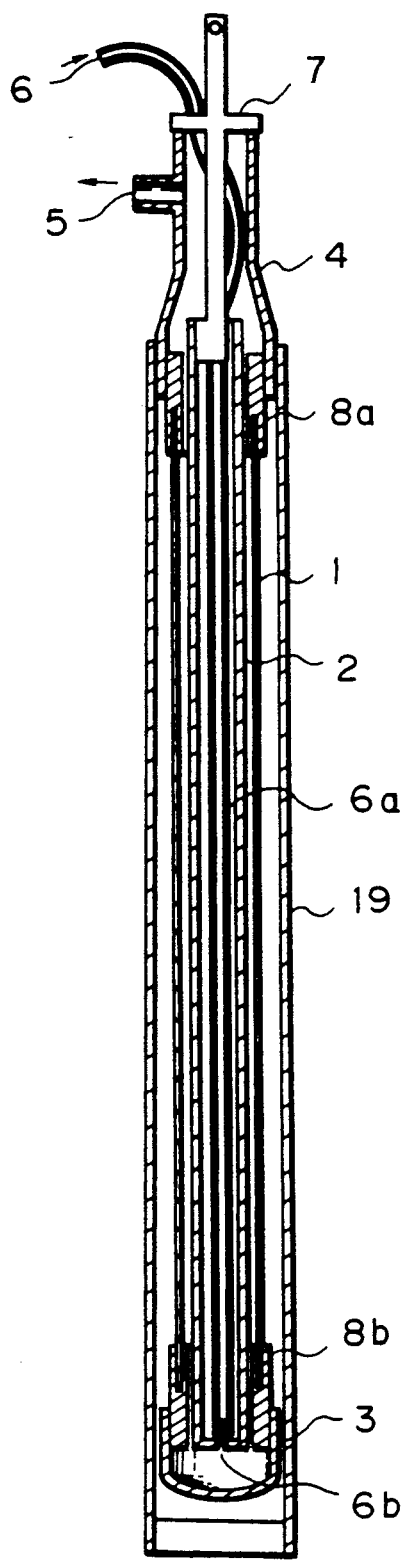
FIG. 1 is a diagram illustrating the vertical section of one embodiment of the electrode apparatus for the dialysis according to the present invention.

FIG. 1 is a diagram illustrating the vertical section of one embodiment of the electrode apparatus for the dialysis according to the present invention. Referring to FIG. 1, a cylindrical electrode 2 is inserted in a tubular ion exchanger 1 having both the ends opened. An upper lid 4 and a lower lid 3 are fitted on the upper and lower ends of the tubular ion exchanger 1 through connecting members 8a and 8b. The lower end of the tubular ion exchanger 1 is closed by the lower lid 3, but the upper lid 4 fitted on the upper end has an opening for insertion of the electrode 2 into the tubular ion exchanger 1. In order to prevent breaking of the tubular ion exchanger 1 by downward pressing of the lower lid 3 fitted on the lower end of the tubular ion exchanger 1 by the lower end of the electrode 2, the electrode 2 is suspended by supporting the upper lid 4 by a flange arranged in the vicinity of the top end of the electrode 2. Also the tubular ion exchanger 1 per se is suspended from the upper lid 4, and the lower end of the tubular ion exchanger 1 is not secured to the electrode 2 but is kept in the state of a free end and the lower end of the tubular ion exchanger 1 can move in the axial direction (vertical direction) according to the elongation and contraction of the tubular ion exchanger 1. Electrolyte supply opening 6 via exit 6b and discharge opening 5 are formed on the lower lid 3 and upper lid 4, respectively, to circulate an electrolyte in the tubular ion exchanger 1 from one end to the other end.

More specifically, the inner diameter of the connecting member 8b arranged on the lower end of the tubular ion exchanger 1 is larger than the outer diameter of the lower end portion of the electrode 2. Accordingly, the lower end of the tubular ion exchanger 1 can move freely according to the elongation and contraction of the tubular exchanger 1.

In the embodiment illustrated in FIG. 1, the electrode 2 is hollow, and an electrolyte supply path 6a is formed in the interior of the electrode 2, and an exit 6b is formed on the lower end of the electrode 2. Accordingly, the electrolyte is supplied in a space defined by the outer surface of the electrode 2 and the inner surface of the tubular ion exchanger 1 through the supply opening 6, the supply path 6a and the exit 6b, and the electrolyte flows upward in FIG. 1 and is discharged to the outside from the discharge opening 5.

Figure 2:
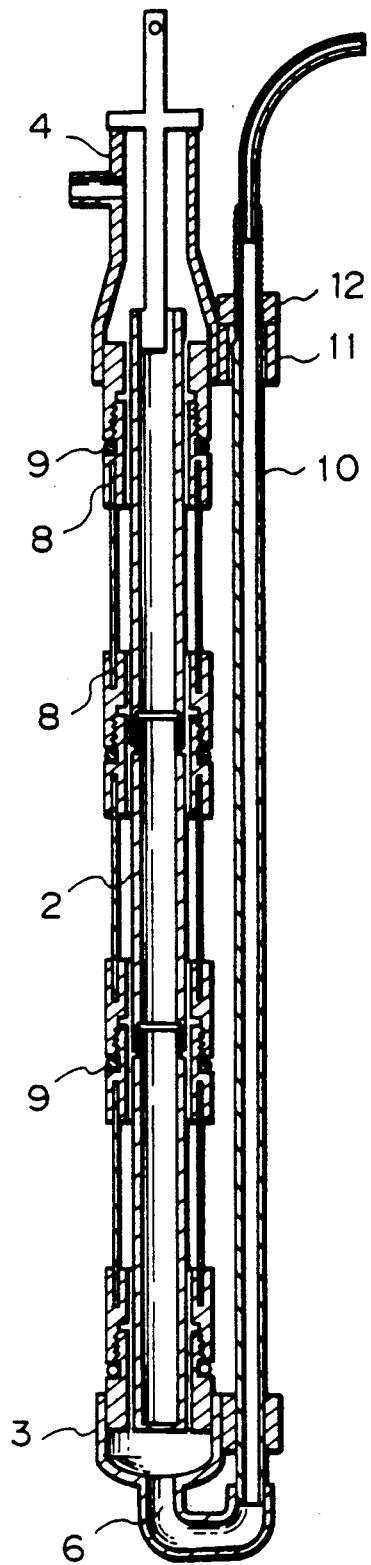
FIGS. 2, 3 and 3-A are diagrams illustrating the vertical sections of other embodiments of the electrode apparatus for the dialysis according to the present invention.

FIG. 2 is a diagram illustrating the vertical section of another embodiment of the electrode apparatus for the dialysis according to the present invention. Referring to FIG. 2, connecting members 8 are secured to both the ends of each of three tubular ion exchangers 1 having both the ends opened, by bonding using an adhesive, fusion bonding or other optional means. The connecting members 8 are threaded and the tubular ion exchangers 1 are connected to one another through packings 9. Furthermore, three electrodes 2 are connected to one another through screws. Accordingly, the electrode apparatus for the dialysis can be divided according to the length of each tubular ion exchanger 1. By adopting this structure, assembling of the electrode apparatus for the dialysis can be facilitated, and even if the tubular ion exchanger is broken, repairing can be easily accomplished only by exchanging the broken ion exchanger with a new ion exchanger.

Referring to FIG. 2, an electrolyte supply tube 10 formed of a rigid material is attached to an electrolyte supply opening 6 formed on a lower lid 3 on the lower end of the tubular ion exchanger 1 to extend in the axial direction of the tubular ion exchanger 1 along the outer surface of the tubular ion exchanger 1. The lower end of the electrolyte supply tube 10 is secured to the lower lid 3, and the upper end of the electrolyte supply tube 10 is passed through a guide tube 11 secured to the upper lid 4 and fixed above the guide tube 11 by a nut 12. The distance between the upper lid 4 and lower lid 3, that is, the length of the tubular ion exchanger 1, can be adjusted by moving the nut 12 in the axial direction of the supply tube 10. Accordingly, when the electrode apparatus for the dialysis according to the present invention is immersed in an electrodeposition coating liquid, if the nut 12 is moved by a distance corresponding to the elongation of the tubular ion exchanger 1 in the axial direction of the electrolyte supply tube 10 to increase the length of the tubular ion exchanger 1, wrinkling of the tubular ion exchanger 1 can be prevented. Moreover, since the transportation of the electrode apparatus for the dialysis can be performed by carrying the electrolyte supply tube 10 by hands, and therefore, breaking of the tubular ion exchanger can be prevented during the transportation.

The electrolyte supply tube exerts the three functions, that is, supply of the electrolyte, adjustment of the distance between the upper and lower lids and reinforcement against bending, in combination. However, these three functions can be exerted by three different members, respectively. For example, there may be adopted a modification in which a pliable hose for the supply of the electrolyte is connected to the supply opening of the lower lid and the upper and lower lids are connected to each other through a rigid rod or cylinder.

The present invention is prominently characterized in that a self-supporting tubular ion exchanger integrally formed with no seam is used as a permselective membrane surrounding the electrode and this tubular ion exchanger is used as a barrier membrane for separating a liquid to be dialyzed from an electrolyte without using a particular supporting member supporting the membrane surface. Since this tubular ion exchanger is integrally formed with no seam, the size, strength, elongation and other physical properties are uniform throughout the tubular ion exchanger, and therefore, the ion exchange member is structurally stable and strong. Moreover, convexities and concavities as observed on the seam are not present on the surface of the tubular ion exchanger and the entire surface is smooth. Accordingly, when this tubular ion exchanger is built in the electrode apparatus for the dialysis, leaking of the electrodeposition coating liquid into the electrode portion and leaking of the electrolyte into the electrodeposition coating tank can be advantageously prevented. In case of the conventional seamed bonded membrane, when the membrane is immersed in the electrodeposition coating liquid or the like, since the seam portion is heterogeneous with other portion, the elongation or contraction is not uniform in the membrane, and therefore, the membrane is wrinkled and leakage of the liquid is caused. In contrast, in the tubular ion exchanger used in the present invention, the contraction and elongation are uniform and wrinkling of the membrane and leaking of the liquid can be prevented.

Furthermore, in the tubular ion exchanger of the present invention, since the ion-exchange membrane is formed to have an integral seamless tubular structure having a self-supporting property and a high strength, the ion exchanger can be used in the surface-free state, that is, without using a particular supporting member. Accordingly, the liquid or generated gas does not stay on the membrane surface or in the vicinity thereof, with the result that the ion exchanger is hardly oxidized and reduction of the ion exchange capacity or reduction of the efficiency of removal of a neutralizing agent or the like from the electrodeposition coating liquid can be prevented. Moreover, since a heavy metal component contained in the electrodeposition coating liquid is promptly removed from the system, sedimentation or accumulation of the heavy metal component can be controlled to a very low level, and hence, rise of the electric resistance of the membrane can be prevented. In the present invention, these functions are combined, and as the result, the durability of the electrode apparatus is improved, the power consumption is reduced and the inherent object of the electrode apparatus for the dialysis, that is, stable formation of a uniform coating for a long period by the electrodeposition coating, can be attained.

In the electrode apparatus for the dialysis, the tubular ion exchanger used should have a permselectivity to ions attracted to the electrode. Namely, in the case where the electrode is a cathode, a cation-exchanger having a permselectivity to cations should be used, and in the case where the electrode is an anode, an anion-exchanger having a permselectivity to anions should be used. In other words, a cation-exchanger is used in case of the anion type electrodeposition coating and an anion-exchanger is used for the cation type electrodeposition coating. In some case, an amphoteric ion exchanger having an anion exchange group and a cation exchange group can be used.

The tubular ion exchanger used in the present invention should have a sufficient tensile strength to support its own weight. For example, in case of a tubular ion exchanger having an inner diameter of 44 mm, a thickness of 3 mm and a length of 1000 mm, it is preferred that the tensile strength be at least 0.1 kg/cm$^2$. Furthermore, the ion exchanger should have a durability capable of resisting the change of the hydraulic pressure in a solution used for the electrodeposition coating. For example, in case of a tubular ion exchanger having an inner diameter of 44 mm, a thickness of 3 mm and a length of 1000 mm, it is preferred that the mechanical strength be such that when a pressure of 0.1 kg/cm$^2$ is applied to the tubular ion exchanger from the inner side, no substantial deformation is caused.

The kind of the ion exchanger used in the present invention is not particularly critical, so far as the ion exchanger has a permeability selectivity to a cation or anion and satisfies the above-mentioned requirements. However, in general, a tubular ion exchanger composed of a blend comprising a matrix component of a thermoplastic resin such as polyethylene or other olefin resin and an ion-exchange resin component is preferably used. Polyethylene is preferably used as the matrix resin component because the water resistance and oxidation resistance are good and molding is possible at a relatively low temperature not causing decomposition of the ion-exchange group. A resin having an anion-exchange group or cation-exchange group bonded to the polymer chain can be used as the ion-exchange resin component. Preferably, the ion-exchange resin component has a crosslinked structure. The matrix resin component may be crosslinked or not crosslinked, and a crosslinked structure may be introduced between the matrix resin component and the ion-exchange resin component. It is preferred that the ion-exchange capacity of the tubular ion exchanger be 1.5 to 3.5 meq/g, especially 1.8 to 2.5 meq/g. It also is preferred that the matrix resin component/ion-exchange resin component weight ratio in the tubular ion exchanger be from 3/7 to 6/4, especially from 4/6 to 5/5.

In connection with the dimensions of the tubular ion exchanger, for the dialysis treatment of the electrodeposition coating liquid, it is preferred that the outer diameter be 10 to 200 mm, especially 50 to 100 mm, the thickness be 0.5 to 10 mm, especially 2 to 4 mm, and the length be 100 to 10,000 mm, especially 500 to 4,000 mm.

The process for the preparation of the tubular ion exchanger is not particularly critical. For example, the ion exchanger can be prepared by impregnating a tubular polyethylene porous body with a monomer mixture liquid comprising at least (A) a polymerizable monomer having a functional group suitable for introduction of an ion-exchange group, (B) a crosslinking agent and (C) a radical polymerization initiator, and introducing an ion-exchange group after molding and polymerization. In this case, in order to obtain a good tubular ion exchanger by impregnating the porous body with the monomer mixture liquid and polymerizing the monomer mixture liquid, it is important that a tubular porous body formed of polyethylene should be used as the substrate. Any polyethylene type resin can be used. For example, there can be mentioned high-density polyethylene, low-density polyethylene, an ethylene copolymer and polyethylene graft-modified with, for example, methacrylic acid. It is preferred that the porous body should have an average pore size of about 1 to about 500 μm, especially 10 to 200 μm, and a porosity of 10 to 80%, especially 30 to 60%.

The process for the preparation of this polyethylene porous body is not particularly critical. For example, there is preferably adopted a process in which according to the powder molding method, which is one of methods of molding plastics, starting powdery polyethylene is partially fused to form a so-called sintered tubular porous body. Furthermore, there can be adopted a process in which a mixture of polyethylene and calcium carbonate is extrusion-molded in the tubular form and the calcium carbonate is decomposed and extracted to obtain a porous body, and a process in which polyethylene is mixed with an appropriate foaming agent and the mixture is melt-extruded and foamed to obtain a porous body.

The monomer mixture liquid has a known composition customarily used for the production of an ion-exchange resin membrane, and it is indispensable that the monomer mixture liquid should comprises at least (A) a polymerizable monomer having a functional group suitable for the introduction of an ion-exchange group, (B) a crosslinking agent and (C) a radical initiator.

The polymerizable monomer having a functional group suitable for the introduction of an ion-exchange group includes even a polymerizable monomer having a functional group that can be converted to an ion-exchange group. For example, there can be mentioned monovinyl compounds such as styrene, chloromethylstyrene, vinyltoluene, vinylxylene, α-methylstyrene, acetonaphthylene, vinylnaphthalene, α-halogenated styrene, α, β, β-trihalogenated styrene and chlorostyrene. When a cation exchanger is prepared, there are used styrene, chloromethylstyrene, methacrylic acid, acrylic acid, styrene-sulfonic acid, vinylsulfonic acid, maleic acid and itaconic acid. When an anion exchanger is prepared, there are used vinylpyridine, methylvinylpyridine, ethylvinylpyridine, vinylpyrrolidone, vinylcarbazole, vinylimidazole, aminostyrene, alkylaminostyrene, dialkylaminostyrene, trialkylaminostyrene, methylvinylketone, chloromethylstyrene, acrylic acid amide, acrylamide oxime, vinylpyrroline, styrene, chloromethylstyrene and vinyltoluene.

As the crosslinking agent (B), there can be used polyvinyl compounds such as m-, p- and o-divinylbenzenes, divinylsulfone, butadiene, chloroprene, isoprene, trivinylbenzenes, divinylnaphthalene and trivinylnaphthalene.

As the radical polymerization initiator (C), there can be used, for example, benzoyl peroxide, dicumyl peroxide and azoisobutyronitrile.

If necessary, a monomer copolymerizable with the monovinyl compound (A) and polyvinyl compound (B) can be used. For example, there can be mentioned styrene, acrylonitrile, ethylstyrene, vinyl chloride, acrolein, methylvinylketone, maleic anhydride, maleic acid, salts and esters thereof, and itaconic acid, salts and esters thereof.

As another substance, there can be used linear polymeric substances soluble in the monomer mixture liquid, such as polystyrene, polybutadienes, polyisoprenes, polybutylenes, styrene/butadiene copolymers and ethylene/propylene copolymers, fine powders of polyvinyl chloride, polyethylene and polypropylene, plasticizers such as dioctyl phthalate, dibutyl phthalate, tributyl phosphate and alcohol esters of aliphatic acids and aromatic acids, and solvents such as tetralin, p-xylene and benzene. By using the foregoing components, a pasty monomer mixture liquid is prepared.

For impregnating the tubular polyethylene porous body with the monomer mixture liquid and polymerizing the monomer mixture liquid, there can be adopted a process in which the porous body is immersed in the monomer mixture liquid and then taken up from the monomer mixture liquid, the porous body is covered with a film of, for example, Vinylon or Tetron, and polymerization is affected by heating in an autoclave under pressurization with nitrogen gas, a process in which the porous body is charged in a casting mold, the monomer mixture liquid is cast in the mold, bubbles were removed from the cast liquid, and polymerization is affected by heating in an autoclave under pressurization with nitrogen gas, and a process in which the porous body impregnated with the monomer mixture liquid is immersed in a solvent having no compatibility with the monomer mixture liquid, for example, an aqueous solution of an inorganic salt, at a high temperature to affect polymerization. Furthermore, the tubular polyethylene porous body can be impregnated partially or completely with the monomer mixture liquid according to the coating method.

The tubular polymer formed by impregnation and polymerization is converted to a desired cation exchanger or anion exchanger by introduction of an appropriate ion-exchange group according to the functional group of the monomer by known means such as sulfonation, chlorosulfonation, chloromethylation, amination, conversion to a quaternary ammonium salt, a quaternary pyridinium salt or hydrolysis.

The tubular ion exchanger preferably used in the present invention can also be prepared according to the following process. More specifically, a mixture of an ion-exchange resin powder and a heat-moldable thermoplastic resin, especially an olefin resin such as a polyethylene resin, is extrusion-molded in the form of a tube. A known ion-exchange resin powder can be used without any limitation, but a fine powder having an average particle size smaller than 100 μm is preferably used. Either high-density polyethylene or low-density polyethylene can be used as the polyethylene resin. However, use of a polyethylene resin having a melt index smaller than 2 g/10 min is preferable because reduction of the ion exchange capacity by extrusion molding can be prevented. In view of the mechanical strength and ion exchange capacity of the obtained tubular ion exchanger, it is preferred that the ion-exchange resin powder/polyethylene resin mixing weight ratio be from 7/3 to 4/6. For extrusion molding of the mixture into the tubular form, a customary extrusion molding method can be adopted without any limitation. However, the molding temperature is maintained at a level not decomposing the ion-exchange group, and a shorter molding time is preferable. Thus, a tubular ion exchanger having a size similar to that of the tubular ion exchanger prepared according to the above-mentioned method can be prepared.

Figure 3:
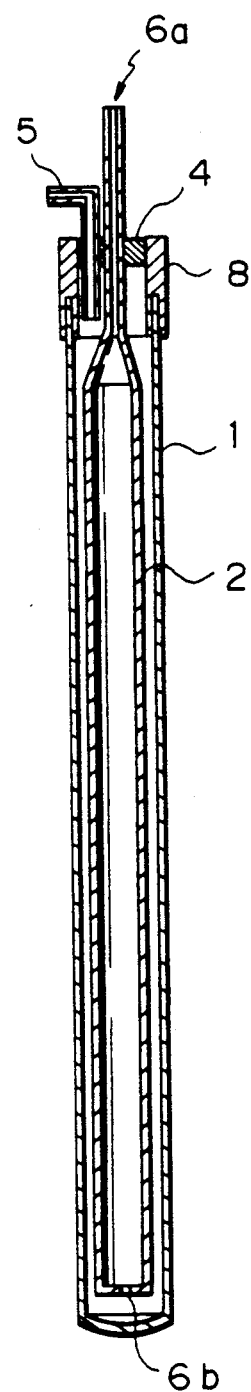
Figure 3A:
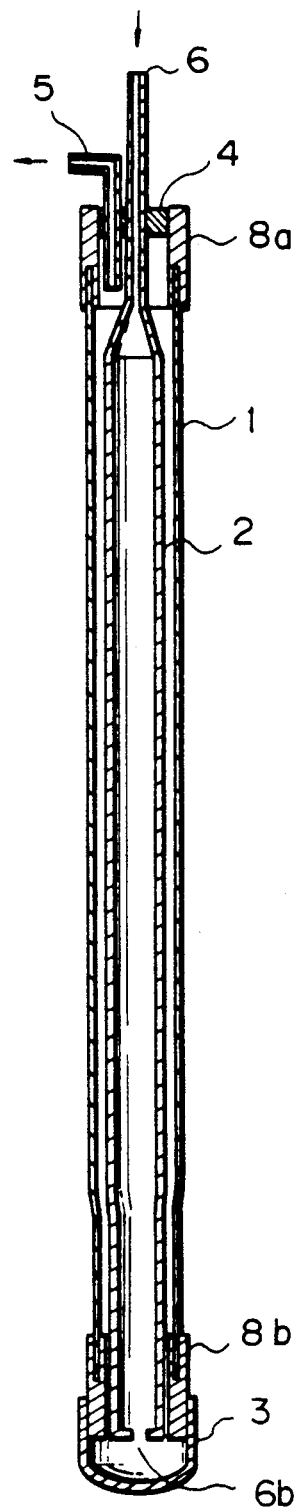

Incidentally, the tubular ion exchangers shown in FIGS. 1 and 2 have both the ends opened. A tubular ion exchanger having one end closed as shown in FIG. 3 can be prepared by appropriately modifying the preparation process. Also this tubular ion exchanger can be used in the present invention. Instead of the tubular ion exchanger having one end closed by the ion exchanger per se, as is apparent to those skilled in the art, a tubular ion exchanger having one end closed by a lid 3 as shown in FIG. 3-A can be used.

The electrode used in the present invention is appropriately selected according to the kind of the tubular ion exchanger. Namely, a cathode is used for the tubular cation exchanger and an anode is used for the tubular anion exchanger. Known cathodes and anodes can be used in the present invention. It is sufficient if the electrode has a predetermined shape such that the electrode can be located within the tubular ion exchanger. In general, the electrode has a rod-like, plate-like or cylindrical shape. For example, a cathode or anode composed of stainless steel or a metal anode of the platinum group metal having an acid resistance can be used. The electrode is arranged within the tubular ion exchanger so that the distance between the electrode and the inner surface of the tubular ion exchanger is 0.5 to 50 mm. In the case where a longitudinal electrode apparatus is used, a large quantity of gas is accumulated in the upper portion, and an electric current flows more easily in the lower portion and the electric current distribution becomes uneven. Accordingly, in this case, a lath-type or punched porous electrode capable of removing the gas from the current-applied side to the back side is preferably used. Furthermore, in order to easily accumulate the formed gas on the back from the electric current-applied side, it is preferred that the electrode be disposed within the tubular ion exchanger so that in the upper portion, the electric current-applied side of the electrode is close to the counter electrode and in the lower portion, the electric current-applied side of the electrode is distant from the counter electrode.

In the present invention, one end of the electrode 2 is supported by the lid fitted on one end of the tubular ion exchanger 1. As the supporting method, there can be adopted a method in which the flange 7 formed on one end of the electrode 2 is supported by the upper lid 4, as shown in FIGS. 1 and 2, and in the case where a lid is formed by potting one end of the tubular ion exchanger 1 with an adhesive, as shown in FIG. 3, there can be adopted a method in which the electrode 2 is fixed so that the electrode 2 pierces through a lid formed by using an adhesive from the outside of the hollow portion of the tubular ion exchanger 1 to the interior of the hollow portion.

In general, the electrode apparatus for the dialysis according to the present invention is used in the vertical state where the axis of the tubular ion exchanger extends substantially in the vertical direction, and the portion just above the top end of the tubular ion exchanger is immersed in the electrodeposition coating liquid, while the liquid discharge opening 5 is not immersed in the coating liquid. In this case, the lower open end of the tubular ion exchanger is closed by the lower lid 3 so that mingling of the electrolyte in the hollow portion of the tubular ion exchanger with the electrodeposition coating liquid is not caused, though the upper end may be opened. When the electrode apparatus for the dialysis according to the present invention is entirely immersed in the electrodeposition coating liquid, it is necessary that both the open ends of the tubular ion exchanger should be closed by lids.

The upper and lower lids can be bonded to the ends of the tubular ion exchanger directly by an adhesive or by mechanical clamping means using an O-ring or the like. Alternatively, there can be adopted a method in which connecting members 8 are fixed to the ends of the tubular ion exchanger by the above-mentioned means and the upper and lower lids are connected to the connecting members 8. In view of the facility of the exchange of tubular ion exchangers, it is preferred that the connecting members 8 be dismountably connected to the upper and lower lids by means of screws or the like, as shown in FIG. 2.

Any of electrically insulating materials can be used for the upper and lower lids. In general, rigid polyvinyl chloride, polypropylene, polyethylene and other plastic material are preferably used. Lids can be formed by potting with an adhesive, as shown in FIG. 3. The size of the tubular ion exchanger differs between the dry state and the wet state by the swelling or contraction. Therefore, it is preferred that a solvent-resistant, relatively soft adhesive or a rubbery adhesive be used for connecting the connecting members to the upper and lower lids. Furthermore, there is preferably adopted a method in which the bonding face of the tubular ion exchanger is inactivated in advance by decomposing the ion-exchange group on the bonding face by an oxidizer or the like and bonding is then carried out.

Electrolyte supply and discharge openings are arranged in the electrode apparatus for the dialysis according to the present invention so that the electrolyte flows in the hollow portion of the tubular ion exchanger from one end to the other end. For example, there is preferably adopted a method in which, as shown in FIG. 1, an electrolyte supply opening 6b is formed in the lower lid 3 and an electrolyte discharge opening 5 is formed in the upper lid 4, and the electrolyte is discharged from the discharge opening 5 by overflowing. Furthermore, there can be adopted a method in which, as shown in FIGS. 1, 3 and 3-A, a tubular electrode is used, the electrolyte is supplied in the hollow portion of the tubular electrode from the upper end thereof, the electrolyte is supplied into the hollow portion of the tubular ion exchanger from the electrolyte supply opening 6b formed on the lower end of the electrode, the electrolyte is circulated through the hollow portion of the tubular ion exchanger from the lower end to the upper end, and the electrolyte is discharged from the electrolyte discharge opening formed in the upper lid.

After the electrodeposition coating, the following method is preferably adopted for discharging the electrolyte supplied into the tubular ion exchanger. As shown in FIG. 4, an electrolyte discharge tube 13 having one end opened is connected to an electrolyte supply tube 10, and valves 14 and 15 are arranged on the electrolyte supply tube 10 at two positions with the point of the connection of the electrolyte discharge tube 13 put therebetween. Furthermore, a valve 16 is arranged on the electrolyte discharge tube 13. When the electrode apparatus for the dialysis is taken out from the electrodeposition coating liquid or the electrodeposition coating liquid is withdrawn from the tank, the valve 15 is closed and the valves 14 and 16 are opened to fill the electrolyte in the electrolyte discharge tube 13. Then, the valve 14 is closed and the valve 15 is opened, and the electrolyte in the tubular ion exchanger is easily discharged by the principle of siphon.

Water can be used as the electrolyte, but in order to remove the acid or alkali stably at a high efficiency, there is preferably adopted a method in which an acidic or alkaline electrolyte dialyzed in a tank disposed outside is diluted to a low concentration with water and is then circulated.

According to need, in a large bath tank for the electrodeposition coating, the electrode apparatus for the dialysis according to the present invention is modified to construct a long apparatus by bonding at least two tubular ion exchangers by using an appropriate adhesive or flange or screw means, as shown in FIG. 2.

If, as shown in FIG. 5, two tubular ion exchangers are connected through a pliable cylinder 17, the electrode apparatus for the dialysis can be bent at the position of the pliable cylinder 17. In the embodiment shown in FIG. 5, connecting members 8 are fitted and fixed to the ends of the tubular ion exchangers 1 by bonding using an adhesive or fusion bonding. The connecting members 8 are threaded. Furthermore, threaded connecting members 8' are secured to both the ends of the pliable cylinder 17, and the connecting members 8' are connected to the connecting members 8 of the tubular ion exchangers 1.

Incidentally, electrodes 2 in the two tubular ion exchangers are connected to each other through a pliable conductor 18.

Figure 6A:
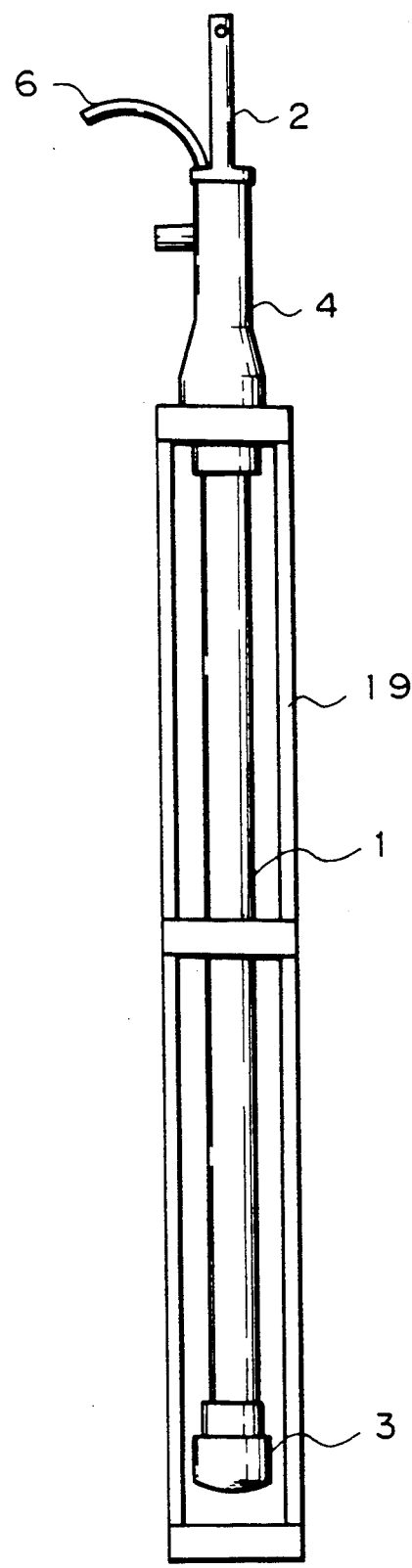
FIGS. 6 and 6-A are diagrams illustrating the vertical sections of still other embodiments of the electrode apparatus for the dialysis according to the present invention.
Figure 6:
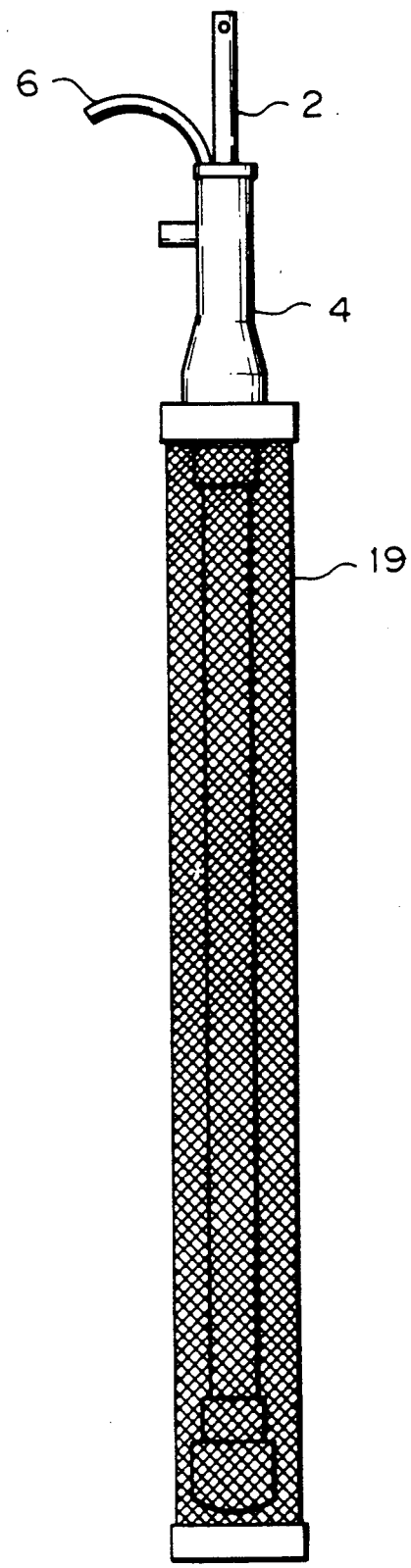

In the electrode apparatus for the dialysis according to the present invention, in order to prevent breaking the tubular ion exchange during the handling, it is preferred that as shown in FIG. 6, many openings be formed not to disturb the flow of a solution used for the electrodeposition coating or the like or a meshed frame 19 be attached as a cover on the outer surface of the tubular ion exchanger, or as shown in FIG. 6-A, a frame-like 19 be formed. In this case, it is especially preferred that the electrode apparatus for the dialysis be fixed so that the lower end of the frame 19 is located below the lower lid 3. In the case where this arrangement is adopted, even if the electrode apparatus for the dialysis is located in the bottom portion of the electrolytic cell or on the floor, since the lower lid of the electrode apparatus for the dialysis is not contacted with the bottom of the electrolytic cell or the floor, breaking of the tubular ion exchanger by compression by the lower lid can be prevented. When the electrode apparatus for the dialysis is immersed in the electrodeposition coating liquid, because of the movement of the lower lid by the elongation of the ion exchanger, the frame 19 is caused to act as a guide.

As pointed out hereinbefore, the electrode apparatus for the dialysis according to the present invention is generally arranged in the electrodeposition coating liquid so that the axis of the tubular ion exchanger extends substantially in the vertical direction. However, if a bendable portion as mentioned above is formed as shown in FIG. 5, the electrode apparatus for the dialysis can be arranged so that the axis of the tubular ion exchanger extends in the horizontal direction. Moreover, there can be adopted a method in which two electrode apparatuses are arranged in a V-shape configuration, the lower ends of both the apparatuses are connected to each other through an electrolyte supply tube.

As is apparent from the foregoing description, in the electrode apparatus for the dialysis, the tubular ion exchanger as the barrier membrane is excellent in the durability over the conventional ion exchange membrane, and the electrode apparatus of the present invention has a simple structure and can be easily manufactured without using any supporting member (reinforcer). In the electrode apparatus of the present invention, since a supporting member or the like is not present between the tubular ion exchanger and the electrode, the residence of an acid or alkali to be dialyzed, impurities, such as heavy metals, contained in the electrodeposition coating liquids and gases generated at the electrode can be prevented and they can be promptly discharged by the circulation of the electrolyte. Accordingly, in the apparatus of the present invention, the residence of gases or sedimentation of heavy metals in the tubular exchanger can be controlled to a very low level. Accordingly, increase of the electric resistance with the lapse of time or unevenness of the electric current distribution is eliminated, and the power consumption can be reduced and the dialysis of an acid or alkali can be accomplished at a high efficiency. Therefore, for example, in case of the electrodeposition coating, a uniform coating can be obtained.

When the electrode apparatus for the dialysis according to the present invention is immersed in an electrodeposition coating liquid, the lower end of the tubular ion exchanger freely moves in the vertical direction according to the elongation of the tubular ion exchanger. Accordingly, wrinkling of the tubular ion exchanger by the elongation of the tubular ion exchanger is not caused, and hence, there is no risk of breaking by wrinkling and the durability is highly improved.

The present invention has been described mainly with reference to the electrode apparatus for the electrodeposition coating. However, the present invention is not limited to the electrode apparatus for the electrodeposition coating, but the electrode apparatus for the dialysis according to the present invention can be similarly used for electroplating or the like.

The present invention will now be described in detail with reference to the following examples that by no means limit the scope of the invention.

Examples of the preparation of the tubular ion exchanger will now be described.

EXAMPLE 1

A sintered polyethylene tubular porous body having an outer diameter of 50 mm, an inner diameter of 44 mm, a length of 1 m, an average pore size of about 100 $\mu$m and a porosity of about 50% was prepared from a powdery mixture comprising 80% by weight of powdery polyethylene and 20% by weight of powdery polypropylene according to the powder molding method. Separately, a pasty monomer mixture liquid was prepared by mixing 100 parts by weight of styrene, 5 parts by weight of divinylbenzene, 50 parts by weight of vinyl chloride powder, 15 parts by weight of dioctyl phthalate and 2 parts by weight of benzoyl peroxide.

The polyethylene porous body was immersed in the monomer mixture liquid and bubbles were removed by reducing the pressure. Then, the porous body was taken up from the monomer mixture liquid and covered with a Vinylon film, and the monomer mixture was polymerized by heating at 100° C. in an autoclave for 5 hours under pressurization (1 kg/cm$^2$) with N$_2$ gas to form a cylindrical polymer. Then, the tubular polymer was immersed in a concentrated sulfuric acid solution at 55° C. for 24 hours to affect sulfonation and obtain a tubular cation exchanger.

The electric resistance of the tubular cation exchanger was about 30 $\Omega$.cm$^2$ in a 0.5N NaCl solution (25° C.), and the transport number by the membrane potential in a 0.5N NaCl/2.5N NaCl solution was 93%. Both the end openings of the tube were closed by rubber plugs, and when the inner hollow portion of the tubular cation exchanger was filled with water and the inner hydraulic pressure was adjusted to 0.5 kg/cm$^2$, the cation exchanger was slightly deformed but no breaking was caused at all. The tubular cation exchanger was formed into a tube having a length of 20 cm, and both the ends were closed by rubber plugs. The tube was immersed in a water tank (bottom portion) having a water depth of 5 m while keeping the hollow portion empty. No substantial deformation was found.

EXAMPLE 2

A chloromethylating solution was prepared by mixing 100 parts by weight of chloromethyl methylether, 70 parts by weight of dichloroethane and 20 parts by weight of ZnCl$_2$. The tubular polymer obtained in Example 1 was immersed in this chloromethylating solution (25° C.) and the chloromethylation was conducted for about 4 hours. Then, the chloromethylated tubular polymer was washed with methanol and then immersed in an aminating solution (25° C.) comprising 100 parts by weight of a 30% by weight aqueous solution of trimethylamine, 40 parts by weight of acetone and 100 parts by weight of water and the amination was conducted for 16 hours to obtain a tubular anion exchanger.

When the electric resistance and transport number of the obtained tubular anion exchanger were measured in the same manner as described in Example 1, the electric resistance was about 35 $\Omega.cm^2$ and the transport number was 91%. When the hydraulic pressure was applied to the tubular anion exchange from the outside and from the inside in the same manner as described in Example 1, no substantial deformation was found and breaking was not caused at all.

EXAMPLE 3

A sintered tubular polyethylene porous body having an outer diameter of 70 mm, an inner diameter of 64 mm, a length of 70 cm, an average pore size of 20 $\mu$m and a porosity of about 40% was prepared from high-density polyethylene according to the powder molding method. Separately, a pasty monomer mixture liquid was prepared by mixing 100 parts by weight of polyethylene powder (having an average diameter smaller than about 30 microns), 100 parts by weight of chloromethylstyrene, 20 parts by weight of divinylbenzene, 2 parts by weight of styrene/butadiene rubber and 6 parts by weight of benzoyl peroxide.

A cover formed of a Vinylon film was arranged on each of the inner and outer surfaces of the tubular polyethylene porous body, and the covered porous body was inserted in a casting mold (the outer diameter of the inner mold part was 63 to 64 mm and the inner diameter of the outer mold part was 70 to 71 mm). Then, the monomer mixture liquid was filled in the hollow portion of the porous body and bubbles were removed by reducing the pressure. The mold was closed by plugs, and the treatment was carried out at 105° C. in an autoclave for 10 hours. The tubular polymer molded body was recovered from the mold. The obtained tubular body was immersed in the same aminating solution as used in Example 2 for 16 hours to affect the amination and obtain a tubular anion exchanger.

When the measurements of the tubular anion exchanger were carried out in the same manner as described in Example 1, it was found that the electric resistance was about 40 $\Omega.cm^2$ and the transport number was 93%. At the hydraulic pressure test, no substantial deformation was found and breaking was not caused at all.

EXAMPLE 4

A sintered polyethylene porous body having an average pore size of about 100 $\mu$m and a porosity of about 50% and having a tubular shape having an outer diameter of 50 mm, an inner diameter of 44 mm and a length of 1 m was placed in a casting mold, and a pasty mixture liquid prepared from polyethylene powder (having an average size smaller than about 30 $\mu$m), chloromethylstyrene, divinylbenzene, styrene/butadiene rubber and benzoyl peroxide was cast into the casting mold to impregnate the porous body with the pasty monomer mixture liquid. The pressure was reduced to remove bubbles, and polymerization was carried out under heating to obtain a tubular polymer molded body. Then, the tubular molded body was immersed in an aminating solution to affect the amination and obtain a tubular anion exchanger.

The obtained tubular anion exchanger had an electric resistance of about 25 $\Omega.cm^2$ in a 0.1N solution of NaCl (25° C.), an exchange capacity of 2.5 meq/g and a tensile strength of 20 kg/cm$^2$. When a hydraulic pressure of 0.5 kg/cm$^2$ was applied from the outer side and from the inner side, no substantial deformation was found.

EXAMPLE 5

A pulverization product (the average particle size smaller than 100 $\mu$m) of an anion-exchange resin comprising a styrene/divinylbenzene copolymer as the skeleton and a quaternary ammonium base as the exchange group was mixed with low-density polyethylene powder having a melt index of 0.4 g/10 min and stearic acid, and the mixture was molded into a tubular anion exchanger having an outer diameter of 50 mm, an inner diameter of 44 mm and a length of 1 m by using an extrusion molding machine.

The obtained anion exchanger had an electric resistance of about 50 $\Omega.cm^2$ in a 0.1N solution of NaCl (25° C.), an ion exchange capacity of 2.2 meq/g and a tensile strength of 21 kg/cm$^2$. When both the ends of the hollow portion of the anion exchanger was closed and a hydraulic pressure of 0.5 kg/cm$^2$ was applied to the hollow portion, no substantial deformation was observed.

Examples of the membrane electrode apparatus will now be described.

EXAMPLE 6

Three tubular anion exchangers (1 m) prepared in Example 4 were connected, and a plate-shaped anode of SUS 304 having a width of 40 mm, a thickness of 3 mm and a length of 3700 mm was inserted into the hollow portion of the tube. The lower end of the tube was closed by a cap and an open type cap was mounted on the upper end portion of the tube. An electrolyte supply pipe was connected to the bottom of the cap disposed on the lower end portion of the tube. An electrolyte discharge pipe was attached to the side portion of the cap mounted on the upper end portion, and a tank was arranged outside the tube. The concentration of the electrolyte was controlled by automatically adding pure water according to the specific electroconductivity, and the concentration-controlled electrolyte was circulated. The connection of the tubular anion exchangers and the attachment of the caps and pipes to the upper and lower end portions were affected by using joint caps and pipes of rigid polyvinyl chloride (PVC) and an adhesive.

In a solution comprising a bisphenol type epoxy resin cationic paint as the main component and acetic acid as the neutralizing agent, a degreased iron article to be coated was arranged and two membrane electrode apparatuses assembled in the above-mentioned manner were arranged so that the iron article was located between the electrode apparatuses. In this state, a direct current voltage was applied. At the start of the application of the direct current voltage, the voltage was 250 V and the current value was about 25 A, and the current value was reduced with the lapse of time. A coated article having a good coating was obtained by applying the direct current voltage for 5 minutes. The paint was supplied to the solution during the coating operation so that the concentration was maintained at a constant level, and water was added to the electrolyte for the membrane electrode apparatus in the tank located outside so that the electrolyte was circulated at a constant concentration.

Then, a new article to be coated was immersed in the solution and the electrodeposition coating was carried out under the same conditions as described above. When the direct current voltage was applied for 5 minutes, the current value was similarly changed with the lapse of time and a coated article having a good coating was obtained. When the electrodeposition coating was repeated 20 times in the same manner, good coated articles could be obtained under substantially the same electrodeposition conditions. During this operation, the current efficiency of removal of the neutralizing agent (acid) was 92%.

EXAMPLE 7

A membrane electrode apparatus of the present invention was constructed by arranging an anode in the tube in the same manner as described in Example 6 except that the length of the tube was changed to 2 m by connecting two tubular ion exchangers (1 m) prepared in Example 4. For comparison, a membrane electrode apparatus having a similar structure was assembled by filling a tubular porous plastic network as a support in a space between the tubular anion exchanger and the electrode.

An automobile body as the article to be coated was placed as the cathode in a cation type electrodeposition coating solution having the same composition as electrode apparatuses of the present invention and the comparative electrode apparatuses (4 apparatuses as a whole) were assembled at equal distances from the automobile body. In this state, the working test was carried out. For application of electricity, a constant voltage type direct current power source was arranged and the four membrane electrode apparatuses were connected in parallel. An ammeter was set for each electrode apparatus. The test conditions were the same as described in Example 6.

Under the constant voltage, at the initial stage, the current value in the membrane electrode apparatus of the present invention was about 15 A and the current value in the comparative membrane electrode apparatus was about 13 A. These values were reduced with the lapse of time, and after the continuous operation was conducted for about 3 months, the current value in the apparatus of the present invention was about 14 A and the current value in the comparative apparatus was about 8 A. With respect to each membrane electrode apparatus, the ratio of removal of the neutralizing agent (acid) was measured at the initial stage and after about 3 months' continuous operation. The obtained results are shown in Table 1.

TABLE 1

|  | Removal current efficiency (%) in apparatus of present invention | Removal current efficiency (%) in comparative apparatus |
| --- | --- | --- |
| at initial stage | 92.1 | 92.0 |
| after 3 months | 90.1 | 79.8 |

After 3 months' operation, each membrane electrode apparatus was disassembled, and the exchange capacity was measured with respect to each tubular anion exchanger. The obtained results and the results of the measurement of the initial exchange capacity are shown in Table 2.

TABLE 2

|  | Exchange capacity (meq/g) in Apparatus of present invention | Exchange capacity (meq/g) in comparative apparatus |
| --- | --- | --- |
| at initial stage | 2.5 | 2.5 |
| after 3 months | 2.4 | 2.0 |

After about 3 months' continuous operation, the fluorescent X-rays intensity of the inner surface of each tubular anion exchanger was measured. In each of the anion exchangers of the apparatus of the present invention and the comparative apparatus, heavy metals such as Fe, Cr, Pb, Ni and Sn were detected, but in the comparative anion exchanger, the intensity was much higher and the presence of the heavy metals even in the interior portion was strongly detected.

From the foregoing measurement results, it is construed that in the comparative membrane electrode apparatus comprising the network interposed between the tubular anion exchanger and the electrode, the tubular anion exchanger was strongly oxidized presumably because of the presence of the network and the ready residence of the liquid and gas, this oxidation resulted in larger reduction of the exchange capacity and neutralizing agent (acid) removal current efficiency than in the apparatus of the present invention, and sedimentation of heavy metals in the tubular anion exchanger caused rise of the electric resistance and reduction of the current value with the lapse of time in the comparative apparatus.

EXAMPLE 8

A lath-like plate having a width of 40 mm and a length of 150 cm, which comprised a Ti substrate and a Pt plating having a thickness of 5 $\mu$m was inserted as the anode in the hollow portion of the tubular anion exchanger (1.3 m) prepared in Example 5, and in the same manner as described in Example 6, the lower end portion was closed by a cap and an open type cap was mounted on the upper end portion. An electrolyte supply pipe was connected to the bottom of the cap mounted on the lower end portion of the tube and an electrolyte discharge pipe was attached to the side portion of the cap mounted on the upper end portion. A tank was disposed outside the electrode apparatus. The concentration of the electrolyte was controlled by automatically adding pure water according to the specific electroconductivity, and the concentration-controlled electrolyte was circulated. Incidentally, the caps and electrolyte supply and discharge pipes were composed of rigid polyvinyl chloride and they were connected and secured by using an adhesive.

In an electrodeposition coating solution comprising a bisphenol type epoxy resin cationic paint as the main component and lactic acid as the neutralizing agent, a degreased iron article to be coated was immersed as the cathode, and two of membrane electrode apparatuses prepared in the above-mentioned manner were arranged as the anode so that the iron article was interposed between the electrode apparatuses. In this state, a direct current voltage was applied in the same manner as described in Example 6.

At the initial stage, the current value was about 27 A under a constant of 300 V, but the current value was reduced with the lapse of time. After 4 minutes, the application of electricity was stopped. A coated article having a good coated surface state was obtained. A new article to be coated was treated again by applying the direct current. Thus, the electrodeposition coating was repeated 20 times. The change of the current value with the lapse of time was substantially the same at each run. During this operation, the ratio of removal of the neutralizing agent was 90.5%. The elongation of the tubular ion exchanger was 8%, but wrinkling was not caused.

EXAMPLE 9

Three of tubular anion exchangers (1 m) prepared in Example 4 were connected as shown in FIG. 2, and three cylindrical anodes of SUS 304, each having an outer diameter of about 38 mm, an inner diameter of about 33 mm and a length of 1 m, were connected and inserted into the tube of the assembled electrode apparatus. The lower end portion of the tube was closed by a lower lid and an open type upper lid was mounted on the upper end portion of the tube. An electrolyte supply opening was connected to the bottom of the lower lid mounted on the lower end portion of the tube, and an electrolyte discharge opening was arranged on the side portion of the upper lid mounted on the upper end portion of the tube. A tank was arranged outside the apparatus, and the concentration of an electrolyte was controlled by automatically adding pure water according to the specific electroconductivity and the concentration-controlled electrolyte was circulated. The connection of the tubular anion exchangers and the arrangement of the upper and lower lids and the electrolyte supply and discharge openings were affected by using joints composed of rigid polyvinyl chloride, and these members were secured by using an adhesive.

In an electrodeposition coating solution comprising a bisphenol type epoxy resin cationic paint as the main component and acetic acid as the neutralizing agent, a degreased iron article to be coated was arranged as the cathode, and two of the membrane electrode apparatuses constructed in the above-mentioned manner were arranged so that the iron article was interposed between the electrode apparatuses. A direct current was applied in this state. At the initial stage, the electric current value was about 25 A at a voltage of 250 V, and the electric current value was reduced with the lapse of time. When electricity was applied for 5 minutes, a coated article having a good coating was obtained. The paint concentration in the solution was maintained at a constant level during the operation while supplying the paint to the solution. In a tank disposed outside the electrode apparatus, water was added to the electrolyte for the electrode apparatus so that a predetermined concentration was maintained, and the concentration-controlled electrolyte was circulated.

Then, a new article to be coated was arranged in the solution, and the electrodeposition coating was carried out under the same conditions as described above. When electricity was applied for 5 minutes, the current value was similarly changed with the lapse of time and a coated article having a good coating was obtained. When the electrodeposition coating was thus repeated 20 times, good coated articles were obtained under substantially the same electrodeposition conditions. During the operation, the current efficiency of removal of the neutralizing agent (acid) was 92%. The elongation of the tubular ion exchanger was 5% but wrinkling was not caused.

EXAMPLE 10

An electrode apparatus as shown in FIG. 1 was constructed by using one tubular ion exchanger (1 m) prepared in Example 4. For comparison, a similar electrode apparatus was constructed by filling a tubular porous plastic network in a space between the tubular anion exchanger and the electrode.

An automobile body as the article to be coated was arranged, and in a cation type electrodeposition coating solution having the same composition as described in Example 9, two each of the electrode apparatuses of the present invention and the comparative electrode apparatuses (4 apparatuses as a whole) were assembled at substantially equal distances from the automobile body. In this state, the working test was carried out. A constant voltage type direct current power source apparatus was arranged for application of electricity, and the four electrode apparatuses were arranged in parallel and an ammeter was set for each electrode apparatus. The test was carried out in the same manner as described in Example 9.

At the initial stage, the current value was about 15 A in the apparatus of the present invention and about 13 A in the comparative apparatus under a constant voltage of 270 V, but the current values were reduced with a lapse of time. After about 3 months' continuous operation, the current value was about 14 A in the apparatus of the present invention and about 8 A in the comparative apparatus. With respect to each electrode apparatus, the ratio of removal of the neutralizing agent (acid) was measured at the start of the operation and after about 3 months' continuous operation. After 3 months' continuous operation, each electrode apparatus was disassembled and the exchange capacity of each tubular anion exchanger was measured. The obtained results were similar to those shown in Tables 1 and 2 of Example 7.

In the electrodeposition coating solution, each tubular ion exchanger elongated by about 10 cm, but in the apparatus of the present invention, no substantial deformation was found, while in the comparative electrode apparatus, since both the ends of the tubular ion exchanger were bonded together with the porous plastic network, the elongation of the tubular ion exchanger was not absorbed and large wrinkles were formed. Accordingly, in the comparative apparatus, rupture was caused by breaking and the tubular ion exchanger was repaired by an adhesive and used again.

We claim:

1. An electrode apparatus for the dialysis during electrodeposition paint coating, including an electrode and an ion-exchange member having a permselectivity to ions attracted in the electrode, wherein said apparatus for the dialysis comprises a self-supportable tubular ion exchanger formed integrally with no side-seam, an electrode disposed within the ion exchanger and arranged in the axial direction an electrolyte from one end of the tubular ion exchanger to the other end thereof.

2. An apparatus as set forth in claim 1, wherein a lid is fitted on one end of the tubular ion exchanger, one end of the electrode is supported and secured to the lid, and the other end of the tubular ion exchanger is capable of moving in the axial direction according to the elongation and contraction of the tubular ion exchanger.

3. An apparatus as set forth in claim 1 or 2, wherein both the ends of the integrally formed tubular ion exchanger are opened.

4. An apparatus as set forth in claim 1 or 2, wherein one end of the integrally formed tubular ion exchanger is opened.

5. An apparatus as set forth in claim 1 or 2, wherein a plurality of integrally formed tubular ion exchangers are connected.

6. An apparatus as set forth in claim 1 wherein the integrally formed tubular ion exchanger is an anion exchanger.

7. An apparatus as set forth in claim 1 or 2, wherein a protecting frame member having a liquid-permeable opening is attached to the periphery of the integrally formed tubular ion exchanger.

8. An apparatus as set forth in claim 1 or 2, wherein the tubular ion exchanger is an extrusion-molded body of a blend comprising a polyethylene matrix component and an ion-exchange resin component.

9. An apparatus as set forth in claim 8, wherein the tubular ion exchanger has a thickness of 0.5 to 10 mm.

10. An electrode apparatus according to claim 8, wherein the tubular ion exchanger has a thickness of 2 to 4 mm.

11. An electrode apparatus according to claim 9, wherein the tubular ion exchanger has a matrix resin component/ion-exchanger resin component weight ratio of from 3/7 to 6/4.

12. An electrode apparatus according to claim 9, wherein the tubular ion exchanger has an ion-exchange capacity of 1.5 to 3.5 meq/g.

13. An electrode apparatus according to claim 9, wherein the tubular ion exchanger has an outer diameter of 10 to 200 mm and a length of 100 to 10000 mm.

* * * * *

UNITED STATES PATENT AND TRADEMARK OFFICE
CERTIFICATE OF CORRECTION

PATENT NO. : 5,049,253

DATED : September 17, 1991

INVENTOR(S) : RYUJI IZUO, ET AL.

It is certified that error appears in the above-identified patent and that said Letters Patent is hereby corrected as shown below:

In column 18, line 62, after "direction" please insert --and a liquid supply and discharge mechanism for circulating--

Signed and Sealed this

Twenty-second Day of November, 1994

Attest:

BRUCE LEHMAN

*Attesting Officer*  *Commissioner of Patents and Trademarks*